(12) United States Patent
Georg et al.

(10) Patent No.: US 11,072,953 B2
(45) Date of Patent: Jul. 27, 2021

(54) HINGE FOR A SWITCHGEAR CABINET HOUSING AND CORRESPONDING SWITCHGEAR CABINET HOUSING AND MOUNTING METHOD

(71) Applicant: RITTAL GMBH & CO. KG, Herborn (DE)

(72) Inventors: Frank-Mike Georg, Dillenburg (DE); Achim Bloh, Hohenahr (DE); Martin Ramdohr, Driedorf-Waldaubach (DE); Markus Neuhof, Ehringshausen-Niederlemp (DE)

(73) Assignee: RITTAL GMBH & CO. KG

( * ) Notice: Subject to any disclaimer, the term of this patent is extended or adjusted under 35 U.S.C. 154(b) by 113 days.

(21) Appl. No.: 16/474,109

(22) PCT Filed: Feb. 15, 2018

(86) PCT No.: PCT/DE2018/100138
§ 371 (c)(1),
(2) Date: Jun. 27, 2019

(87) PCT Pub. No.: WO2018/192606
PCT Pub. Date: Oct. 25, 2018

(65) Prior Publication Data
US 2019/0323273 A1    Oct. 24, 2019

(30) Foreign Application Priority Data

Apr. 21, 2017 (DE) ..................... 10 2017 108 586.6

(51) Int. Cl.
*E05D 5/12* (2006.01)
*H02B 1/38* (2006.01)
(Continued)

(52) U.S. Cl.
CPC .............. *E05D 5/128* (2013.01); *A47B 81/00* (2013.01); *E05D 3/02* (2013.01); *E05D 7/1055* (2013.01);
(Continued)

(58) Field of Classification Search
CPC ......... E05D 15/52; E05D 15/12; E05D 5/128; E05D 5/12; Y10T 403/32901; Y10T 403/32893; H02B 1/38
(Continued)

(56) References Cited

U.S. PATENT DOCUMENTS 713,338 A * 11/1902 Paquette ................. E05D 5/128
16/381
2,847,238 A * 8/1958 Bolling, Jr. ............. F16B 21/18
403/154

(Continued)

FOREIGN PATENT DOCUMENTS

DE      9000424 U1    3/1990
DE     19837379 B4   11/2005
(Continued)

OTHER PUBLICATIONS

International Search Report (in English and German) and Written Opinion (in German) issued in PCT/DE2018/100138, dated May 28, 2018; ISA/EP.

*Primary Examiner* — Emily M Morgan
(74) *Attorney, Agent, or Firm* — Harness, Dickey & Pierce, P.L.C.

(57) ABSTRACT

The invention relates to a hinge for a switchgear cabinet housing, comprising a first and a second hinge half, which can be connected to each other by means of a hinge pin and which can be pivoted relative to each other about a longitudinal axis of the hinge pin, the hinge pin extending only into the first or the second hinge half in a release position and
(Continued)

Figure 1:
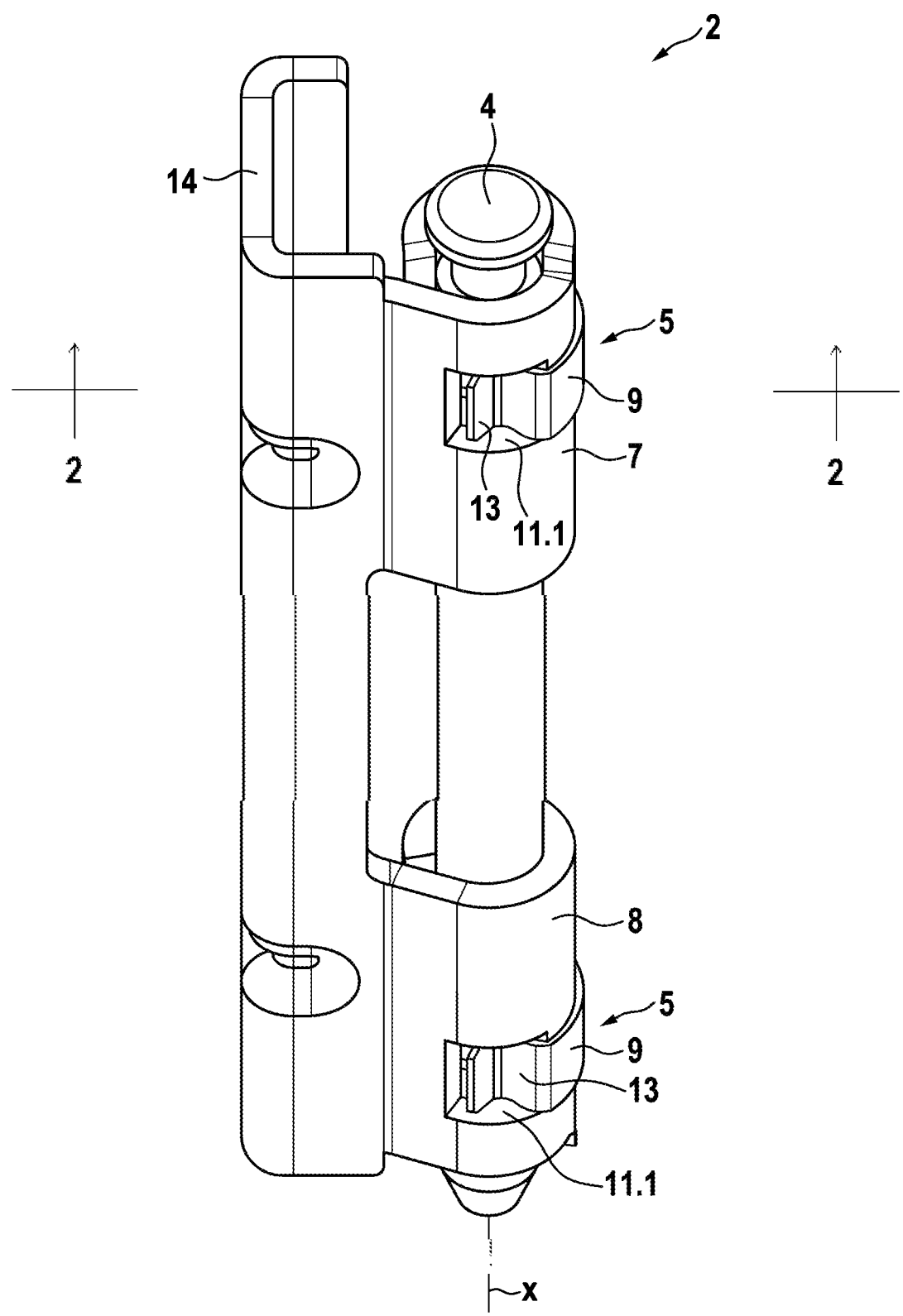

extending into both the first and the second hinge halves in a locking position, wherein the hinge pin is releasably locked by means of at least one spring clip both in the release position and in the locking position. The invention further relates to a corresponding switchgear cabinet housing and to a corresponding method for mounting a door element on a switchgear cabinet body.

9 Claims, 3 Drawing Sheets

(51) Int. Cl.
*A47B 81/00* (2006.01)
*E05D 3/02* (2006.01)
*E05D 7/10* (2006.01)
*E05D 5/06* (2006.01)
*E05D 5/10* (2006.01)

(52) U.S. Cl.
CPC ........ *H02B 1/38* (2013.01); *A47B 2220/0069* (2013.01); *E05D 5/065* (2013.01); *E05D 2003/025* (2013.01); *E05D 2005/102* (2013.01); *E05Y 2600/56* (2013.01); *E05Y 2900/208* (2013.01)

(58) Field of Classification Search
USPC ................. 16/229, 262, 263, 380, 381, 386
See application file for complete search history.

(56) References Cited

U.S. PATENT DOCUMENTS

| | | | | |
|---|---|---|---|---|
| 3,013,297 | A * | 12/1961 | Chamberlain | E05D 7/1022 16/381 |
| 3,298,135 | A * | 1/1967 | Kinser | E05D 5/06 49/380 |
| 3,746,206 | A * | 7/1973 | Utz | B65D 43/164 220/214 |
| 4,623,050 | A * | 11/1986 | Copp | F16D 65/091 188/250 F |
| 5,048,996 | A * | 9/1991 | DuBois | F16B 21/186 403/287 |
| 5,666,695 | A * | 9/1997 | Jegers | E05D 7/1022 16/380 |
| 5,722,121 | A * | 3/1998 | Lau | E05D 5/128 16/381 |
| 5,816,732 | A * | 10/1998 | Nissen | F16G 11/06 403/327 |
| 6,178,599 | B1 * | 1/2001 | Worden | B62D 65/06 16/261 |
| 6,283,565 | B1 | 9/2001 | Köhler et al. | |
| 2008/0053677 | A1 * | 3/2008 | Johnson | H02G 3/14 174/50 |
| 2013/0069511 | A1 * | 3/2013 | Westby | E05D 5/12 312/326 |
| 2017/0268269 | A1 * | 9/2017 | Nicholas, III | E05D 5/12 |

FOREIGN PATENT DOCUMENTS

| | | | |
|---|---|---|---|
| EP | 0340456 A1 * | 11/1989 | ......... E05D 15/5205 |
| EP | 2476844 A2 | 7/2012 | |
| WO | WO-9855720 A1 | 12/1998 | |

* cited by examiner

HINGE FOR A SWITCHGEAR CABINET HOUSING AND CORRESPONDING SWITCHGEAR CABINET HOUSING AND MOUNTING METHOD

CROSS-REFERENCE TO RELATED APPLICATIONS

This application is a 371 U.S. National Stage of International Application No. PCT/DE2018/100138, filed on Feb. 15, 2018, which claims priority to German Application No. 10 2017 108 586.6, filed on Apr. 21, 2017. The entire disclosures of the above applications are incorporated herein by reference.

BACKGROUND

This section provides background information related to the present disclosure which is not necessarily prior art.

TECHNICAL FIELD

The invention is directed to a hinge for a switchgear cabinet housing comprising a first and a second hinge half which can be connected to each other by means of a hinge pin and which can be pivoted relative to each other about a longitudinal axis of the hinge pin. In this case, the hinge pin extends only into the first or the second hinge half in a release position and extends into both the first and the second hinge halves in a locking position. Such a hinge is known from DE 198 37 379 B4. WO 98/55720 A1 also describes a similar hinge.

DISCUSSION

The known hinges have the disadvantage that they are cumbersome to mount. During the mounting of a door element on a switchgear cabinet housing, typically firstly a first hinge half is fastened on the door element and a second hinge half is fastened on the switchgear cabinet body. The switchgear cabinet housing frequently has at least two such hinges vertically spaced apart on its hinge side. After the pre-mounting of the hinge halves on the switchgear cabinet body and the door element, the door element is brought together with the switchgear cabinet body so that a first hinge pin sleeve of the hinge half on the door element side aligns with a second hinge pin sleeve of the hinge half on the switchgear cabinet body side. While it is already cumbersome to arrange the door element and the switchgear cabinet body precisely relative to each other in the above-described alignment and hold them in this position, it is furthermore necessary after completed alignment to insert a hinge pin into the aligned hinge pin sleeves and hammer it in, so that the hinge halves are finally connected to one another.

SUMMARY

This section provides a general summary of the disclosure, and is not a comprehensive disclosure of its full scope or all of its features.

It is therefore the aspect of the invention to refine a hinge of the above-described type in such a manner that it enables simple mounting of a door element on a switchgear cabinet body.

It is accordingly provided that the hinge pin is releasably locked by means of at least one spring clip both in the release position and also in the locking position. A hinge is thus provided which permits the hinge pin to be inserted into one of the hinge halves even before door element and switchgear cabinet body are brought together and to be able to be held locked therein in a defined release position. This makes it possible that after the door element is brought together with the switchgear cabinet body, the hinge pin only still has to be transferred from its release position into the locking position, in which it fixes the two hinge halves so they can be pivoted relative to each other. Because of the defined locking, it is also no longer necessary for the pin to be seated in a friction seat in the hinge sleeves, so that it is secured in the hinge. A form fit between pin and hinge sleeve is sufficient. The pin therefore also no longer has to be hammered in, but rather can be comfortably adjusted manually and possibly even without a tool between the release position and the locking position.

The hinge pin can comprise a first and a second recess, in particular a first and a second ring groove, spaced apart relative to each other along its longitudinal axis. In this case, the spring clip can engage in the first recess in the release position and in the second recess in the locking position.

One of the hinge halves can comprise a first hinge pin sleeve having a first spring clip and a second hinge pin sleeve having a second spring clip. In this case, the hinge pin sleeves can be arranged at a distance relative to each other along the longitudinal axis of the hinge pin, wherein in the release position the hinge pin is only locked via the first spring clip, and wherein in the locking position the hinge pin is locked via the first and the second spring clips. Due to the only single locking of the hinge pin in the release position, it is easy to release from the locking during the installation of the door element on the switchgear cabinet body, to transfer it into the locking position. In the locking position, the hinge pin is in turn doubly secured, however, to avoid inadvertent removal of the hinge pin during the use of the switchgear cabinet.

The spring clip can comprise a tensioning section, which extends along an outer circumference of a hinge pin sleeve of the first or the second hinge half, and a locking catch formed on the tensioning section, which extends in the radial direction of the hinge pin sleeve.

The locking catch can extend through the hinge pin sleeve through a passage extending in the radial direction of the hinge pin sleeve and can be pre-tensioned in the radial direction by means of the tensioning section.

At least one of locking catch, first recess, and second recess can comprise an intake bevel on at least one of two boundary edges spaced apart relative to each other in the longitudinal direction of the hinge pin. The intake bevel can be used in particular to promote a transfer of the hinge pin from the release position into the locking position, in particular by a force in the direction of the locking position being applied to the hinge pin in the direction of its longitudinal axis. In this case, the locking catch can exit out of the recess or ring groove on the outer circumference of the hinge pin under pre-tension of the tensioning section, so that the hinge pin is transferable from the release position into the locking position. Vice versa, the hinge pin can be transferred in the locking position, by application of force along the longitudinal axis of the hinge pin and in the direction of the release position, from the locking position into the release position.

The spring clip can comprise a counter holder, which is formed on the tensioning section at a distance to the locking catch.

The counter holder can extend through the hinge pin sleeve in a further passage extending in the radial direction of the hinge pin sleeve. In particular, the counter holder can extend through the hinge pin sleeve by means of the further passage, wherein it is supported directly on the outer circumference of the hinge pin.

The further passage can be arranged offset around the longitudinal axis by an angle of at least 90° and preferably by an angle of essentially 180° relative to the passage for the locking catch.

The spring clip can be a shaped sheet-metal part which comprises the locking catch at a first of two opposing ends of the tensioning section formed as a sheet-metal strip and comprises the counter holder at a second of the two opposing ends and the spring clip can thus be a spring steel component obtainable by stamping and bending.

According to another aspect, a switchgear cabinet housing is described, which comprises a switchgear cabinet body and a door element fixed thereon by means of at least one hinge of the above-described type.

A method for the mounting of a door element on a switchgear cabinet body comprises the following steps:

providing a switchgear cabinet body, a door element, and at least one hinge of the above-described type, installing the first hinge half on the switchgear cabinet body and the second hinge half on the door element, inserting the hinge pin into a first hinge pin sleeve of the first or the second hinge half and locking the hinge pin in the release position;

bringing together the door element with the switchgear cabinet body, so that the first hinge pin sleeve aligns with a second hinge pin sleeve of the other hinge half, and transferring the hinge pin from the release position into the locking position and locking the hinge pin in the locking position.

Furthermore, the locking of the hinge pin in the release position can be released before the transfer of the hinge pin from the release position into the locking position.

Finally, it can be provided that for the release of the locking, a force is applied to the hinge pin in the release position along its longitudinal axis and in the direction of the locking position and at the same time the spring clip is pre-tensioned, so that a locking catch of the spring clip disengages from a recess of the hinge pin.

The release position and the locking position can be defined locking positions of the hinge pin. In particular, the hinge pin can be accommodated so it is freely movable in the hinge sleeves outside the locking positions, for example, in a form fit, wherein in particular a friction seat of the hinge pin in the hinge sleeves is not necessary according to the invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
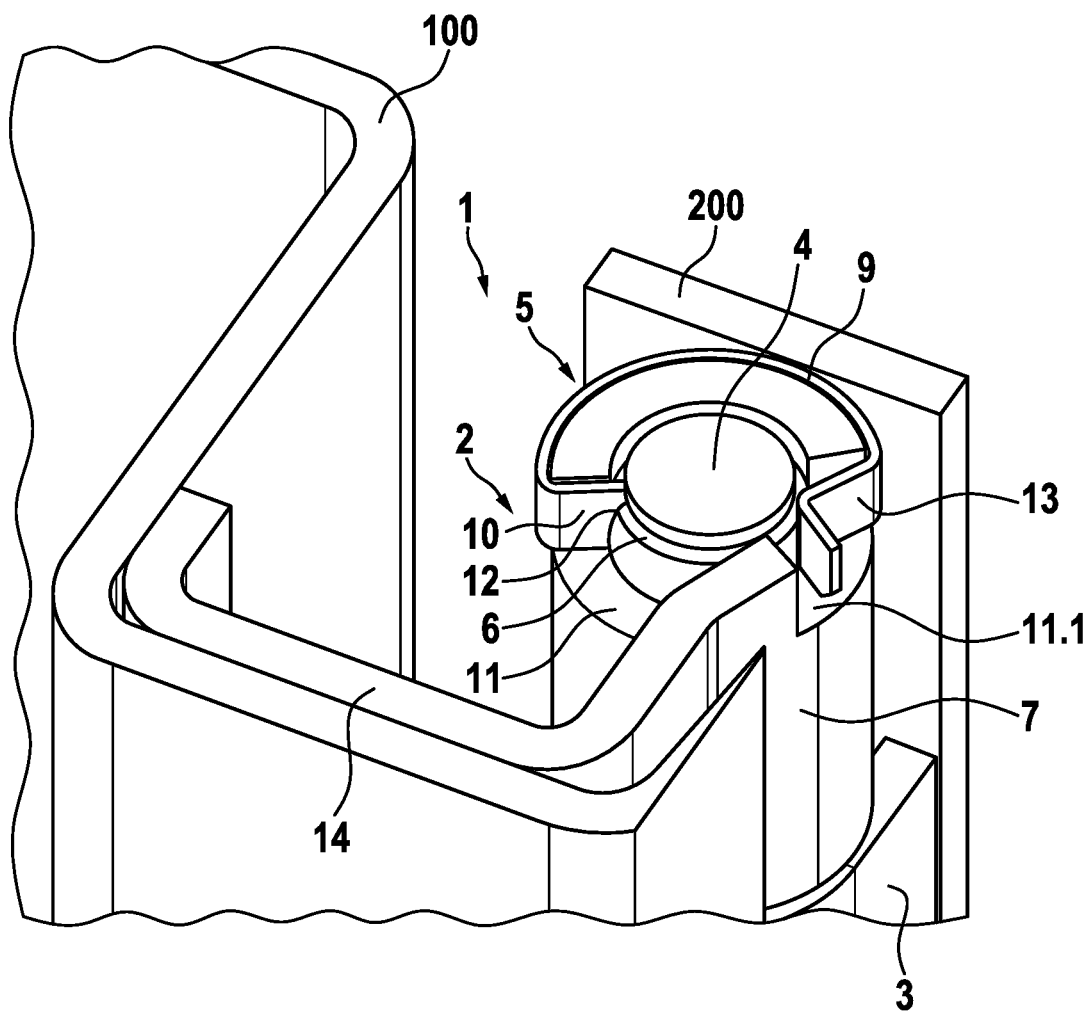
Figure 3:
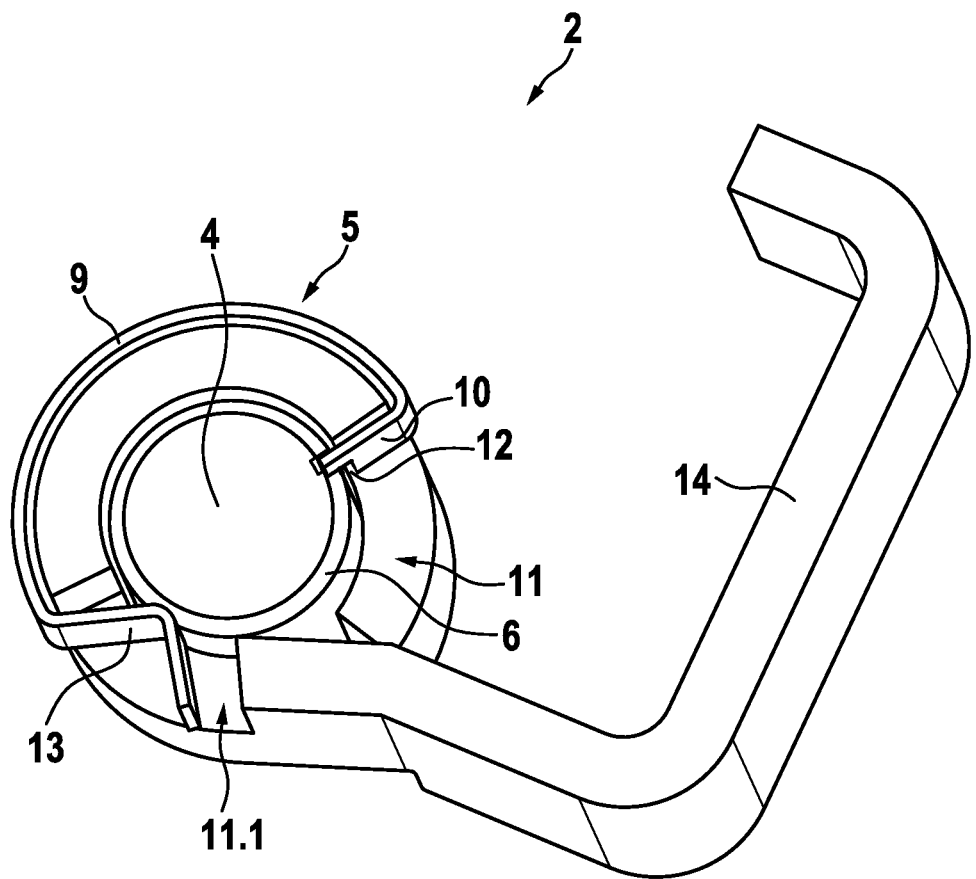

Further details of the invention will be explained on the basis of the following figures. In the figures:

FIG. 1 shows a first hinge half having hinge pin arranged in the locking position in a perspective illustration according to one embodiment of the invention; and FIG. 2 shows a switchgear cabinet housing in cross section perpendicular to the longitudinal axis of the hinge pin along the lines of 2-2 in FIG. 1 and in a perspective illustration according to one embodiment of the invention; and FIG. 3 shows a hinge half having inserted hinge pin in cross section perpendicular to the longitudinal axis of the hinge pin and in the region of the spring clip and also in a perspective illustration according to one embodiment of the invention.

DETAILED DESCRIPTION

Example embodiments will now be described more fully with reference to the accompanying drawings.

FIG. 1 shows a first embodiment of a first hinge half 2 having hinge pin 4 located in the locking position. The longitudinal axis x of the hinge pin forms the pivot axis of the pin, as is fundamentally known in hinges from the prior art. The first hinge half 2 comprises a first hinge pin sleeve 7 and a second hinge pin sleeve 8, which are arranged at a distance relative to each other. A further hinge pin sleeve of a second hinge half (not shown) can be inserted between the hinge pin sleeves 7, 8, so that the three hinge pin sleeves align with one another. When the hinge pin 4 is located in the release position, in which it is drawn upward in the illustration, the hinge pin 4 exposes the region between the hinge pin sleeves 7, 8 of the first hinge half, so that a third hinge pin sleeve of the second hinge half 3 (see, FIG. 2) can be accommodated between the first and the second hinge pin sleeves 7, 8.

In the mentioned release position, the lower end of the hinge pin 4 in the illustration according to FIG. 1 is drawn back into the first hinge pin sleeve 7 and locked via the spring clip 5 of the upper hinge pin sleeve 7.

If, in this arrangement of first hinge half 2 and hinge pin 4, a second hinge half is arranged having its further hinge pin sleeve between the hinge pin sleeves 7, 8 of the first hinge half 2 in such a way that the three passages of the hinge pin sleeves align, the hinge pin 4 can be transferred from the release position into the locking position by being transferred in the locking position by application of force with pre-tension of the spring clip 5 and thus release of the locking of the hinge pin 4 in the release position, to be locked there in each case via both spring clips 5 of both the first hinge pin sleeve 7 and also the second hinge pin sleeve 8. The spring clip 5 comprises a tensioning section 9, which essentially follows an outer contour of the hinge pin sleeves 7, 8 and thus presses flatly against the outer circumference of the hinge pin sleeves 7, 8. The tensioning section 9 is essentially formed as a spring steel plate strip, on the opposing ends of which the counter holder 13 and the locking catch 10 (see FIG. 2), respectively, are formed. The counter holder 13 extends by means of a further passage 11.1, which extends in the radial direction relative to the first hinge pin sleeve 7 or the second hinge pin sleeve 8, through the respective hinge pin sleeve 7, 8, to press against an outer circumference of the hinge pin and thus support the spring clip against the hinge pin 4 when, during the transfer of the hinge pin 4 from the release position into the locking position or from a locking position into the release position, the spring clip 5 is pre-tensioned with deformation of the tensioning section 9, so that the locking catch 10 (see FIG. 2) exits out of the recess on the outer circumference of the hinge pin 4.

This is explained further in detail with reference to FIGS. 2 and 3. FIG. 2 shows a switchgear cabinet housing consisting of a switchgear cabinet body 100 and a door element 200 fixed thereon via a hinge 1 of the type described above with reference to FIG. 1. For better visualization of the illustrated embodiment of the invention, the switchgear cabinet housing is shown in a plane of section perpendicular to the longitudinal axis x of the hinge pin and in the region of the spring clip 5.

The first hinge half 2 is fixed via its mounting flange 14 inside a U-bend of the switchgear cabinet housing. The first hinge pin sleeve 7 is formed directly on the mounting flange 14. In particular, the first hinge half 2 can be a shaped sheet-metal part obtainable by stamping and bending. The hinge pin sleeve 7 recognizably has a passage 11 and a further passage 11.1 at essentially opposing positions, wherein the passages 11, 11.1 extend essentially radially through the hinge pin sleeve 7 relative to the longitudinal axis x of the hinge pin 4.

The counter holder 13 is essentially a 90° bend, which is bent over via an obtuse angle from the tensioning section 9 of the spring clip 5, so that the spring clip extends proceeding from the tensioning section 9 via the counter holder 13 through the wall of the first hinge pin sleeve 7 until it encounters the outer circumference of the hinge pin 4 at the inner circumference of the first hinge pin sleeve 7 and is thus supported on the outer circumference of the hinge pin 4.

On the opposing end of the tensioning section 9, the locking latch 10 is formed via a further bend on the tensioning section 9 and extends essentially in the radial direction of the hinge pin sleeve 7 through the passage 11 of the hinge pin sleeve 7, wherein the locking catch 10 has a point on its free end, using which engages in a recess 6 on the outer circumference of the hinge pin. The recess 6 on the outer circumference of the hinge pin 4 is formed in the present case as a circumferentially closed ring groove. The lower part of the hinge pin similarly includes a groove or recess that likewise engages a locking catch 10 in the spring clip 5 in sleeve 8 when the hinge pin 4 is in the locked position.

The locking catch 10 comprises an intake bevel 12, via which the spring clip 5 is transferred from the locking position shown in FIG. 2 into a release position, when upon application of force to the hinge pin in the direction of the longitudinal axis x of the hinge pin 4, the locking catch 10 is pressed via the intake bevel 10 out of the recess 6 with pre-tensioning of the tensioning section 9, while the spring clip 5 is supported at its opposing end via the counter holder 13 on the hinge pin 4.

The features of the invention disclosed in the above description, the drawings, and the claims can be essential for the implementation of the invention both individually and also in any arbitrary combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A hinge, comprising:
a first hinge half, having a first and second hinge pin sleeves aligned along a longitudinal axis;
a second hinge half;
a hinge pin aligned along the longitudinal axis, the hinge pin having a release position in which the hinge pin is located only within one of the hinge pin sleeves, and a locking position in which the hinge pin is located within both hinge pin sleeves, the hinge pin having at least one groove about its outer circumference;
a spring clip engaging the hinge pin in both the locking and release positions, the spring clip having a tensioning section which extends along an outer circumference of one of the hinge in sleeves, the tensioning section having two opposing ends, one end of the tensioning section having a locking catch extending in a radial direction of the hinge pin sleeve, and the other end of the tensioning section having a counter holder;
the spring clip being a stamped metal part;
the locking catch extending approximately 90 degrees inward from the first opposing end of the tensioning section, to engage said groove in the hinge pin; and
the counter holder being substantially opposite the locking catch and is formed with two planar portions, the first planar portion is bent from the second opposing end of the tensioning section at an oblique angle inward of the tensioning section, and the second planar portion is bent from an end of the first planar portion at an oblique angle outward of the tensioning section.

2. The hinge as claimed in claim 1, in which the hinge pin comprises two grooves, spaced apart in relation to each other along its longitudinal axis, wherein the spring clip engages in the first groove in the release position and engages in the second groove in the locking position.

3. The hinge as claimed in claim 1, further comprising a second spring clip, one spring clip being located on each hinge pin sleeve.

4. The hinge as claimed in claim 3, in which the hinge pin sleeves are arranged at a distance in relation to each other along the longitudinal axis of the hinge pin, wherein in the release position, one of the ring grooves of the hinge pin is engaged by only the first spring clip.

5. The hinge as claimed in claim 1, in which the locking catch extends through the hinge pin sleeve through a passage extending in the radial direction of the hinge pin sleeve and is pre-tensioned in the radial direction via the tensioning section.

6. The hinge as claimed in claim 1, in which the locking catch comprises an intake bevel.

7. The hinge as claimed in claim 1, in which the counter holder extends through the hinge pin sleeve in a further passage extending in the radial direction of the hinge pin sleeve.

8. The hinge as claimed in claim 6, in which the further passage is arranged offset around the longitudinal axis by an angle of at least 90 degrees in relation to the passage for the locking catch.

9. A switchgear cabinet housing having a switchgear cabinet body and a door element secured thereon via at least one hinge as claimed in claim 1.

* * * * *